United States Patent [19]

Ohno

[11] Patent Number: 5,067,803
[45] Date of Patent: Nov. 26, 1991

[54] PHOTOGRAPHIC WIDE ANGLE LENS

[75] Inventor: Kazunori Ohno, Omiya, Japan

[73] Assignee: Fuji Photo Optical Co., Ltd., Omiya, Japan

[21] Appl. No.: 674,889

[22] Filed: Mar. 26, 1991

[51] Int. Cl.$^5$ .......................... G02B 9/08; G02B 13/18
[52] U.S. Cl. ...................................... 359/708; 359/740; 359/794
[58] Field of Search ............... 350/479, 480, 432, 433, 350/434, 435, 450

[56] References Cited

U.S. PATENT DOCUMENTS

| | | | |
|---|---|---|---|
| 4,878,745 | 11/1989 | Endo et al. | 350/480 X |
| 4,932,764 | 6/1990 | Simpson, Jr. | 350/480 X |
| 5,000,552 | 3/1991 | Simpson, Jr. et al. | 350/480 |

FOREIGN PATENT DOCUMENTS 593363 10/1947 United Kingdom ................ 350/480

Primary Examiner—Scott J. Sugarman
Attorney, Agent, or Firm—Oblon, Spivak, McClelland, Maier & Neustadt

[57] ABSTRACT

Described herein is a photographic wide angle lens which is composed of, from the object side thereof, a first lens of positive meniscus having a convex surface on the object side, and a second lens of positive meniscus having a concave surface on the object side, the wide angle lens having an aspheric surface at least on one of the four lens surfaces provided by the first and second lenses to improve astigmatism, spherical aberration and coma. The lens is also arranged to satisfy the condition of $0.85 < fF/fR < 1.15$ (where $fF$ and $fR$ are focal lengths of the first and second lenses, respectively), thereby imparting symmetrical factors to maintain characteristics of the hypergon.

11 Claims, 4 Drawing Sheets

SPHERICAL ABERRATION
SINE CONDITION

FIELD CURVATURE

DISTORTION

SPHERICAL ABERRATION
SINE CONDITION

FIELD CURVATURE

DISTORTION

PHOTOGRAPHIC WIDE ANGLE LENS

BACKGROUND OF THE INVENTION

1. Field of the Invention

This invention relates to a photographic wide angle lens, and more particularly to a photographic wide angle lens system suitable for use in inexpensive panoramic photography.

2. Prior Art

Recently, lens-equipped photographic film packages or the so-called disposable photographic cameras are coming into wide use. Even the cameras of this sort are required to meet increasing demands for various functions. Among the inexpensive photographic cameras now on the market is a new model which permits panoramic photography without adding an optional mechanism for this purpose.

The cameras which are capable of such panoramic photography generally employ a camera construction of a larger scale involving complications in lens and other constructions, which will be eventually reflected by a higher cost and relatively difficult operations in use.

Under these circumstances, there has been introduced a camera for pseudo-panoramic photography, which is arranged to mask the upper and lower portions of frames of an ordinary 35 mm film or the like and to print the oblong picture of each partially masked frame on an enlarged scale.

As a wide angle photographic lens suitable for the inexpensive cameras of the sort mentioned above, there has been known the so-called hypergon lens consisting of two elements, more specifically, a perfectly symmetrical lens system having two identical lens elements located symmetrically on the front and rear sides of an aperture stop. This lens system has a feature that, by employing as lens elements a couple of landscape lenses or so-called meniscus camera lenses each with a concave surface disposed on the side of the aperture stop, it becomes possible to reduce coma, lateral chromatic aberration and distortion while flattening the tangential image plane. However, because of non-flattening of the spherical aberration and sagittal image plane, this lens system is incapable of making corrections to a sufficient degree for astigmatism which causes focusing off the tangential image plane, compelling to sacrifice the brightness and picture quality.

On the other hand, with a wider field angle, the field curvature becomes conspicuous. In this regard, for example, as disclosed in U.S. Pat. Nos. 3,006,248 and 4,932,764, attempts have been made to solve this problem by curving the film surface into a cylindrical shape in conformity with the Petzval image plane. However, this arrangement with a curved film surface lends itself to increase distortion considerably, impairing the feature of the hypergon lens which has less distortion for a flat image plane.

Further, the above-mentioned U.S. Pat. No. 4,932,764, as construed from its claim reading "front lens functions as a landscape lens and has a shorter focal length than said rear lens and said rear lens functions as a meniscus corrector", tries to solve the problem of distortion by balancing distortion with the Petzval field curvature which substantially coincides with the cylindrical film surface. It is gathered from the description in examples that, the ratio (fF/fR) of front lens focal length fF to rear lens focal length fR being about 0.61 to 0.82, the afore-mentioned drawback may be overcome. However, no sufficient improvement is made with regard to astigmatism which is another drawback of the two-element lens system. Accordingly, when the film surface is arranged to fit the sagittal image plane, it will not fit the tangential image plane. Further, even if the film surface is arranged to coincide with the petzval image plane taken as an average image plane, the resultant picture will suffer from degraded picture quality in peripheral regions as compared with center regions, failing to produce a picture which has high picture quality uniformly in overall regions of a picture.

SUMMARY OF THE INVENTION

In view of the foregoing problems, the present invention has as its object the provision of a photographic wide angle lens which is extremely simple in construction and yet capable of panoramic photography.

It is another object of the present invention to provide a photographic wide angle lens which is capable of taking photographs practically free of degradations in picture quality even in the form of enlarged prints.

In accordance with the present invention, there is provided, for achieving the above-stated objectives, a photographic wide angle lens which is composed of, from the object side, a first lens of positive meniscus having the convex surface thereof disposed on the object side, and a second lens of positive meniscus having the concave surface thereof disposed on the object side, the first and second lenses having an aspheric surface at least on one of the four lens surfaces thereof, and satisfying the condition of $$0.85 < fF/fR < 1.15$$

wherein fF is the focal length of the first lens and fR is the focal length of the second lens.

BRIEF DESCRIPTION OF THE DRAWINGS

The above and other objects, features and advantages of the invention will become apparent from the following description and the appended claims, taken in conjunction with the accompanying drawings which show preferred embodiments of the invention and in which:

DESCRIPTION OF PREFERRED EMBODIMENTS

Figure 1:
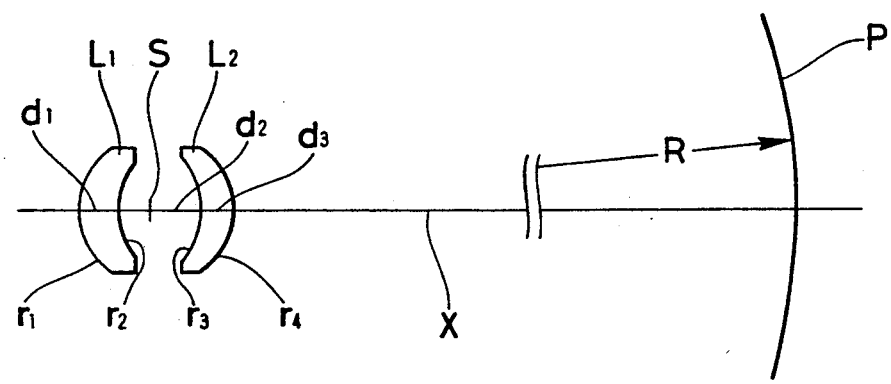
FIG. 1 is a schematic illustration of a lens construction in a first embodiment of the invention.

Hereafter, the invention is described in greater detail by way of the preferred embodiments shown in the drawings.

The wide angle lens according to the present invention has a basic construction which includes a couple of lenses, namely, a first lens $L_1$ in the form of a positive meniscus lens having a convex surface on the object side and a second lens $L_2$ in the form of a positive meniscus lens having a convex surface on the image forming side. Of these lenses $L_1$ and $L_2$, the first lens $L_1$ is located on the object side, while the second lens $L_2$ is located on the image forming side. An aperture stop S is located in a position between the first and second lenses $L_1$ and $L_2$.

Denoted at P is an image plane in which a film is to be located. In this instance, the image plane P is either a plano-plane or a plane which is curved in the direction of film transport, that is, curved in concave shape on the object side. Alternatively, it may be curved in a cylindrical or spherical shape.

In order to retain the hypergon characteristics which permit sufficient correction of lateral chromatic aberration and distortion, the first and second lenses $L_1$ and $L_2$ are located as symmetrically as possible. However, it is necessary to introduce asymmetrical parameters for the purpose of improving spherical aberration and astigmatism which cannot be corrected sufficiently by the hypergon construction. In this connection, the attempts to improve the performance quality by departing from the symmetrical disposition, e.g., by employing an arrangement in which the front lens has a longer focal length than the rear lens (as in U.S. Pat. No. 3,006,248) or conversely the front lens has a shorter focal length than the rear lens (as in U.S. Pat. No. 4,932,764), will give rise to lateral chromatic aberration and distortion, failing to improve the overall performance quality to a sufficient degree.

In consideration of the foregoing observations, the present invention succeeded in attaining an asymmetric construction which retains the hypergon characteristics by holding the focal length of the front lens within a range substantially equal to that of the rear lens, and yet which is improved in lateral chromatic aberration and distortion by providing an aspheric lens surface on at least one of the four lens surfaces defined by the first and second lenses $L_1$ and $L_2$ and forming the first and second lenses $L_1$ and $L_2$ in asymmetric shapes in terms of radius of curvature and center thickness.

Nextly, for the purpose of retaining a certain degree of symmetry between the front and rear lenses, the ratio of the front lens focal length fR to the rear lens focal length fR, fF/fR, is held in the range of $$0.85 < fF/fR < 1.15 \ldots \quad (1)$$

Further, the radii of curvature of the respective lenses are defined as $$0.3 < |(P_1/P_2) - 1| < 0.65 \ldots \quad (2)$$

where
$P_1$ is $(1/r_1 - 1/r_2)f/n_1$;
$P_2$ is $(1/r_3 - 1/r_4)f/n_2$;
$r_1$ is the radius of curvature of the first lens surface on the object side;
$r_2$ is the radius of curvature of the first lens surface on the imaging side;
$r_3$ is the radius of curvature of the second lens surface on the object side;
$r_4$ is the radius of curvature of the second lens surface on the imaging side;
$n_1$ is the index of refraction of the first lens at reference wavelength; and
$n_2$ is the index of refraction of the second lens at reference wavelength.

Thus, astigmatism and spherical aberration can be improved by making at least one surface of the first lens $L_1$ aspheric. Namely, when at least one surface of the first lens $L_1$ is made aspheric, it is expected to have a surface configuration of high order departing from sphericity in a direction away from the optical axis and increasing the degree of asymmetry relative to the second lens $L_2$. This means reduced astigmatism and spherical aberration in the region of high order. On the other hand, when at least one surface of the second lens $L_2$ is made aspheric, it becomes possible to correct spherical aberration, astigmatism and coma which cannot be sufficiently corrected by a spherical surface configuration.

The above-defined conditional formula (1) gives critical factors of symmetry for maintaining desirable characteristics of the hypergon. Falling outside the upper or lower limit of the formula will invite increases in lateral chromatic aberration and distortion which are out of question in case of symmetrical construction and which cannot be expected to give any high performance quality. For instance, the degree of asymmetry is too strong in case of the afore-mentioned U.S. Pat. No. 3,006,248 where the ratio (fF/fR) of front focal length to rear lens focal length is 2.17, and also in case of U.S. Pat. No. 4,932,764 where the ratio is in the range of 0.61 to 0.82 in the four examples given there.

The conditional formula (2) defines the radii of curvatures of the surfaces of the first and second lenses $L_1$ and $L_2$, mainly in consideration of the balance between image plane characteristics and spherical aberration. A lens system outside the upper or lower limit of the formula is improved in image plane characteristics but instead degraded in spherical aberration or in image plane characteristics in peripheral portions despite the improvement in center portions of the picture, failing to guarantee satisfactory performance quality.

The photographic film to be located in the image plane P is curved to have a concave surface on the object side. This contributes to correct the field curvature which is produced by the lens, making corrections necessary for good panoramic photography. The degree of film curving is preferred to be within the range of 50 mm $< -R \leq \infty$ where R stands for the radius of curvature of the film. In this instance, the radius of curvature R is regarded as positive when the convex surface is on the object side.

Hereafter, the invention is illustrated more particularly by way of the following examples 1 to 4.

In any of the lens constructions in the first to fourth exemplary embodiments shown in FIGS. 1, 3, 5 and 7, a positive meniscus lens $L_1$ having a convex surface on the object side and a positive meniscus lens $L_2$ having a concave surface on the object side are disposed face to face through a stop S, and both of the lenses $L_1$ and $L_2$ are made of plastic material.

In the following examples:
$r_i$: Radius of curvature of a lens surface of number i counted from the object side;
$d_i$: Thickness of a lens component or width of an air space of number i counted from the object side;
$n_i$: Index of refraction, for line d, of a lens component of number i counted from the object side;
$v_i$: Abbe number, for line d, of a lens component of number i counted from the object side;
f: Overall focal length of the whole system; and
Bf: Back focal length.

Further, an aspheric surface is indicated by an asterisk "*", and its shape is expressed by $$X = \frac{Y^2/r}{1 + \sqrt{1 - (1 + K)(Y/r)^2}} + \sum_{i=2}^{\infty} a_{i-1} Y^{2i}$$

on the basis of X-axis in the direction of the optical axis and Y-axis in the direction perpendicular to the optical axis (where r is a paraxial radius of curvature, K is eccentricity and $a_{i-1}$ is an aspheric coefficient.)

The particulars in construction of the first embodiment shown in FIG. 1 are as indicated in Table 1 below. The aperture stop S is located at the position of 1.99 from the 2nd surface.

TABLE 1

| m | r | d | nd | νd |
|---|---|---|---|---|
| 1* | 4.417 | 2.24 | 1.49116 | 57.6 |
| 2 | 4.741 | 5.33 | | |
| 3 | −4.997 | 2.07 | 1.49116 | 57.6 |
| 4 | −4.478 | | | |

| f | Bf | R |
|---|---|---|
| 25.234 | 19.274 | −100 |

Aspheric surface 1*

| k | −0.097305 |
|---|---|
| $a_1$ | $-0.20105 \times 10^{-3}$ |
| $a_2$ | $0.18751 \times 10^{-4}$ |
| $a_3$ | $0.22238 \times 10^{-6}$ |
| fF/fR = 1.058 | |
| $|(P_1/P_2) - 1| = 0.333$ | |

Figure 2:
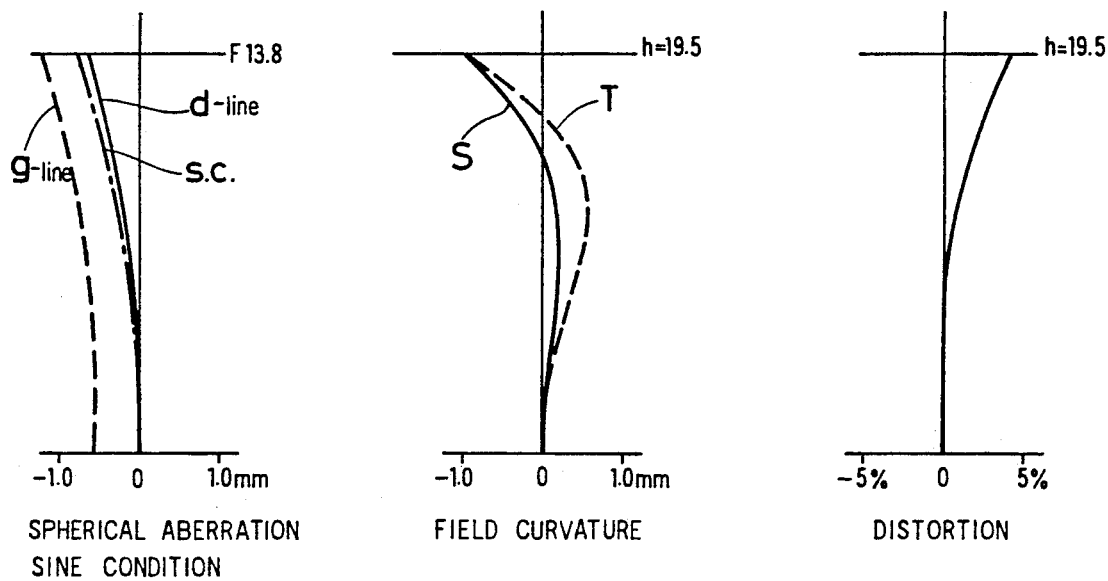
FIG. 2 shows aberration diagrams of the first embodiment.

The aberration diagrams of this embodiment are shown in FIG. 2.

Figure 3:
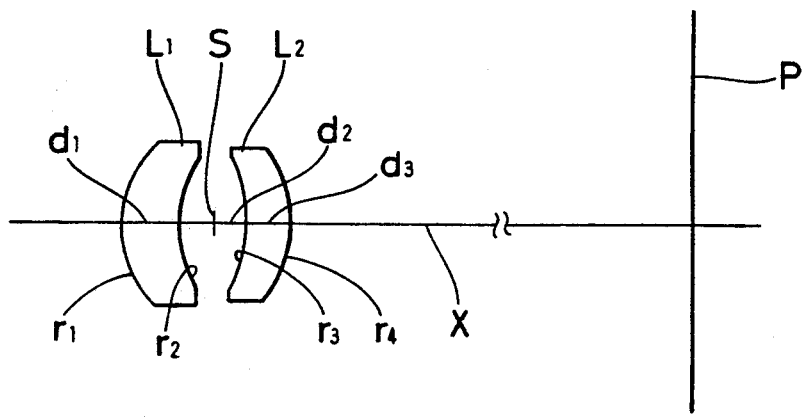
FIG. 3 is a schematic illustration of a lens construction in a second embodiment of the invention.

The particulars in construction of the second embodiment shown in FIG. 3 are as indicated in Table 2 below. The stop S is located at the position of 1.5 from the 2nd surface.

TABLE 2

| m | r | d | nd | νd |
|---|---|---|---|---|
| 1* | 4.801 | 2.60 | 1.49116 | 57.8 |
| 2 | 5.286 | 2.83 | | |
| 3 | −6.913 | 2.00 | 1.49116 | 57.8 |
| 4* | −5.775 | | | |

| f | Bf | R |
|---|---|---|
| 25.299 | 19.850 | ∞ |

Aspheric surface 1*

| k | 0.164363 |
|---|---|
| $a_1$ | $-0.59171 \times 10^{-3}$ |
| $a_2$ | $0.4516 \times 10^{-4}$ |
| $a_3$ | $-0.19878 \times 10^{-5}$ |

Aspheric surface 4*

| k | 0.269890 |
|---|---|
| $a_1$ | $-0.80269 \times 10^{-3}$ |
| $a_2$ | $0.80728 \times 10^{-5}$ |
| $a_3$ | $-0.23897 \times 10^{-5}$ |
| fF/fR = 0.8515 | |
| $|(P_1/P_2) - 1| = 0.330$ | |

Figure 4:
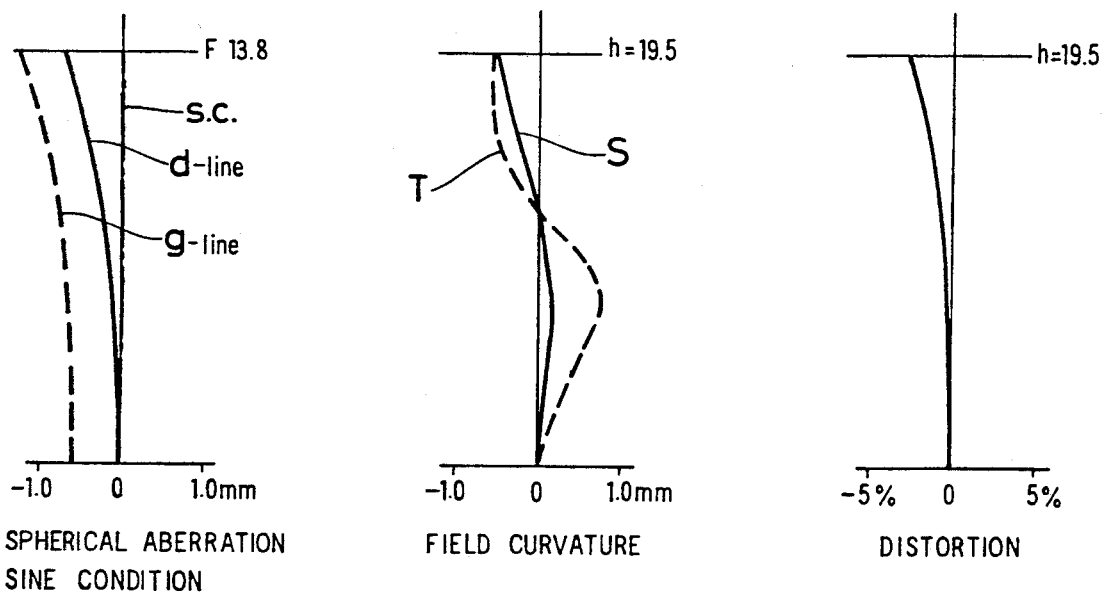
FIG. 4 shows aberration diagrams of the second embodiment.

The aberration diagrams of this construction are shown in FIG. 4.

Figure 5:
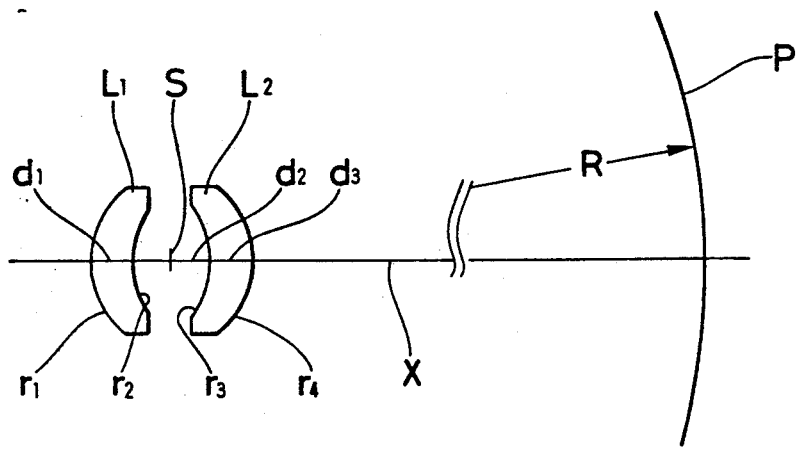
FIG. 5 is a schematic illustration of a lens construction in a third embodiment of the invention.

The particulars in construction of the third embodiment shown in FIG. 5 are as indicated in Table 3 below. The stop S is located at the position of 1.91 from the 2nd surface.

TABLE 3

| m | r | d | nd | νd |
|---|---|---|---|---|
| 1* | 5.084 | 2.65 | 1.49116 | 57.6 |
| 2 | 5.821 | 4.53 | | |
| 3 | −5.072 | 2.63 | 1.49116 | 57.6 |
| 4 | −4.685 | | | |

| f | Bf | R |
|---|---|---|
| 24.950 | 19.490 | −150 |

Aspheric surface 1*

| k | 0.154220 |
|---|---|
| $a_1$ | $-1.41232 \times 10^{-6}$ |
| $a_2$ | $2.24389 \times 10^{-11}$ |
| $a_3$ | $6.97489 \times 10^{-16}$ |
| fF/fR = 0.9696 | |
| $|(P_1/P_2) - 1| = 0.529$ | |

Figure 6:
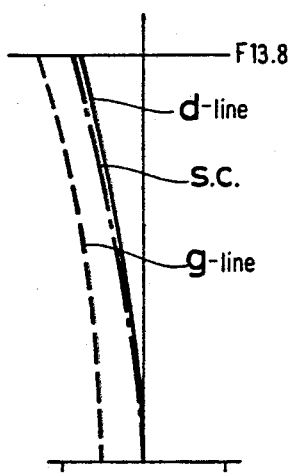
FIG. 6 shows aberration diagrams of the third embodiment.
Figure 6:
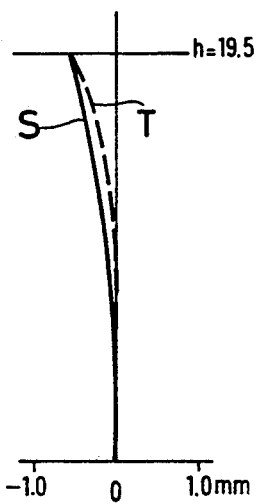
Figure 6:
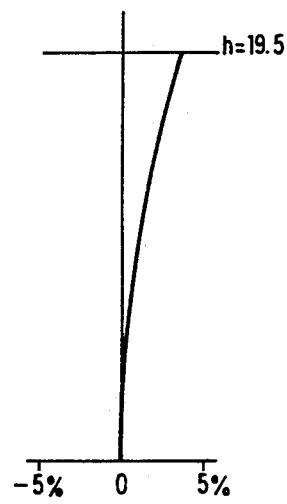

The aberration diagrams of this construction are shown in FIG. 6.

Figure 7:
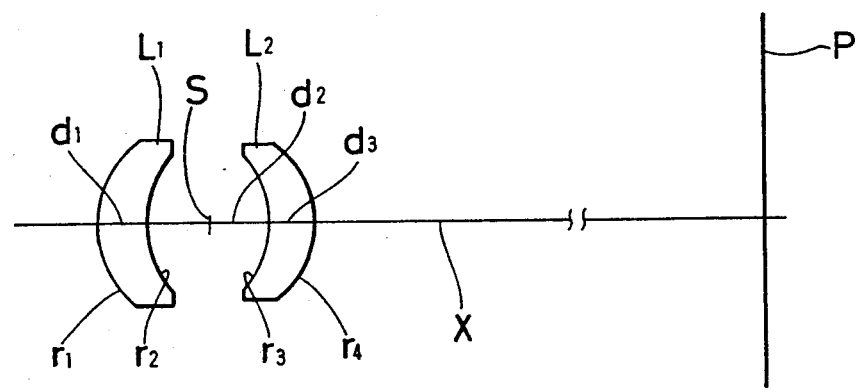
FIG. 7 is a schematic illustration of a lens construction in a fourth embodiment of the invention.
Figure 8:
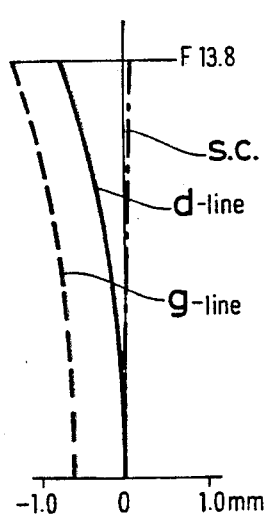
FIG. 8 shows aberration diagrams of the fourth embodiment.
Figure 8:
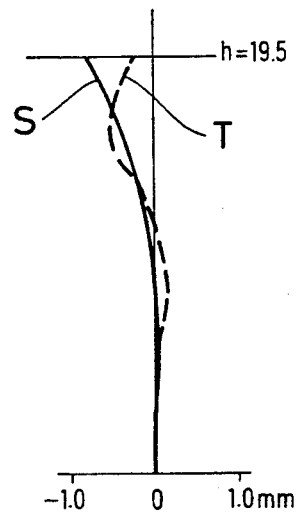
Figure 8:
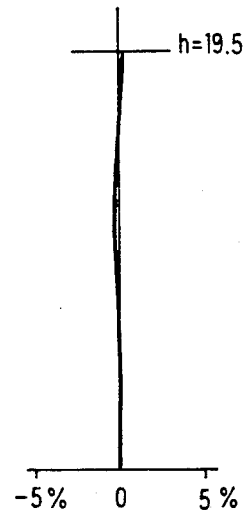

The particulars in construction of the fourth embodiment shown in FIG. 7 are indicated in Table 4 below. The aperture stop S is located at the position of 2.60 from the 2nd surface.

TABLE 4

| m | r | d | nd | νd |
|---|---|---|---|---|
| 1 | 4.211 | 2.24 | 1.49116 | 57.8 |
| 2* | 4.496 | 5.10 | | |
| 3 | −4.225 | 2.10 | 1.49116 | 57.8 |
| 4 | −4.034 | | | |

| f | Bf | R |
|---|---|---|
| 25.300 | 19.355 | ∞ |

Aspheric surface 2*

| k | −0.461587 |
|---|---|
| $a_1$ | $0.11565 \times 10^{-2}$ |
| $a_2$ | $-0.67510 \times 10^{-4}$ |
| $a_3$ | $0.85132 \times 10^{-5}$ |
| fF/fR = 0.9587 | |
| $|(P_1/P_2) - 1| = 0.343$ | |

As clear from the foregoing description, the wide angle lens according to the present invention is composed of first and second positive lenses of substantially same focal lengths, introducing an aspheric surface on at least one of lens surfaces of the first and second lenses thereby to correct spherical aberration, astigmatism and coma to a sufficient degree and in favorable manner. It is to be understood that the introduction of the aspheric surface is not restricted to the particular examples shown hereinbefore, and similar effects can be obtained by providing an aspheric surface at least on one of the four lens surfaces of the first and second lenses.

What is claimed is:

1. A photographic wide angle lens comprising, from the object side thereof, a first lens of positive meniscus having a convex surface on the object side, and a second lens of positive meniscus having a concave surface on the object side, said first and second lenses having an aspheric surface at least on one of the four lens surfaces thereof and satisfying the condition of 0.85 < fF/fR < 1.15 where fF and fR are focal lengths of said first and second lenses, respectively.

2. A photographic wide angle lens as defined in claim 1, wherein an aperture stop is interposed between said first and second lenses.

3. A photographic wide angle lens as defined in claim 1 or 2, wherein photographic material is positioned at the image point of said lens with a photosensitive surface thereof disposed in a flat plane.

4. A photographic wide angle lens as defined in claim 1 or 2, wherein photographic material is located at the image point of said lens with a photosensitive surface thereof curved in a concave shape on the object side.

5. A photographic wide angle lens as defined in claim 1, wherein said first and second lenses are plastic lenses.

6. A photographic wide angle lens comprising, from the object side thereof, a first lens of positive meniscus having a convex surface on the object side, and a second lens of positive meniscus having a concave surface on the object side, said wide angle lens having an aspheric surface at least on one of the four lens surfaces provided by said first and second lenses and satisfying the condition of $$0.85 < fF/fR < 1.15 \ldots \quad (1)$$

where fF and fR are focal lengths of said first and second lenses, respectively, and at the same time satisfying the condition of $$0.3 < |(P_1/P_2) - 1| < 0.65 \ldots \quad (2)$$

where
$P_1$ is $(1/r_1 - 1/r_2)f/n_1$;
$P_2$ is $(1/r_3 - 1/r_4)f/n_2$;
$r_1$ is the radius of curvature of said first lens surface on the object side;
$r_2$ is the radius of curvature of said first lens surface on the imaging side;
f is overall focal length of the whole system;
$r_3$ is the radius of curvature of said second lens surface on the object side;
$r_4$ is the radius of curvature of said second lens surface on the imaging side;
$n_1$ is the index of refraction of said first lens at reference wavelength; and
$n_2$ is the index of refraction of said second lens at reference wavelength.

7. A photographic wide angle lens as defined in claim 6, wherein an aperture stop is interposed between said first and second lenses.

8. A photographic wide angle lens as defined in claim 6 or 7, wherein photographic material is positioned at the image point of said lens with a photosensitive surface thereof disposed in a flat plane.

9. A photographic wide angle lens as defined in claim 6 or 7, wherein photographic material is positioned at the image point of said lens with a photosensitive surface thereof curved in a concave shape on the object side.

10. A photographic wide angle lens as defined in claim 6, wherein said first and second lenses are plastic lenses.

11. A photographic wide angle lens comprising, from the object side thereof, a first lens of positive meniscus having a convex surface on the object side, and a second lens of positive meniscus having a concave surface on the object side, said wide angle lens having an aspheric surface at least on one of the four lens surfaces provided by said first and second lenses, and an aperture stop interposed between said first and second lenses.

* * * * *

UNITED STATES PATENT AND TRADEMARK OFFICE
CERTIFICATE OF CORRECTION

PATENT NO. : 5,067,803
DATED : November 26, 1991
INVENTOR(S) : Kazunori Ohno It is certified that error appears in the above-identified patent and that said Letters Patent is hereby corrected as shown below: On the title page:

The foreign application priority data has been omitted, should be, --March 6, 1991 [JP] Japan............3-063790--.

Signed and Sealed this

First Day of June, 1993

Attest:

Attesting Officer

MICHAEL K. KIRK

Acting Commissioner of Patents and Trademarks